United States Patent
Bian et al.

(10) Patent No.: US 11,536,484 B2
(45) Date of Patent: Dec. 27, 2022

(54) ELECTRONICALLY COMMUTATED MOTOR, HVAC SYSTEM COMPRISING THE SAME, AND METHOD FOR SIGNAL CONVERSION BETWEEN HVAC SYSTEM AND MOTOR

(71) Applicant: Zhongshan Broad-Ocean Motor Co., Ltd., Zhongshan (CN)

(72) Inventors: Wenqing Bian, Zhongshan (CN); Juezhi Xue, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 40 days.

(21) Appl. No.: 17/126,013

(22) Filed: Dec. 17, 2020

(65) Prior Publication Data

US 2021/0381719 A1 Dec. 9, 2021

Related U.S. Application Data

(63) Continuation-in-part of application No. PCT/CN2020/112387, filed on Aug. 31, 2020.

(30) Foreign Application Priority Data

May 8, 2020 (CN) .......................... 202010383705.1
May 8, 2020 (CN) .......................... 202020745319.8

(51) Int. Cl.
*F24F 11/88* (2018.01)
*H02K 11/33* (2016.01)
*F24F 11/72* (2018.01)
*H02P 6/16* (2016.01)
*F24F 11/89* (2018.01)

(52) U.S. Cl.
CPC .............. *F24F 11/88* (2018.01); *F24F 11/72* (2018.01); *H02K 11/33* (2016.01); *H02P 6/16* (2013.01); *F24F 11/89* (2018.01)

(58) Field of Classification Search
CPC . F24F 11/88; F24F 11/72; F24F 11/89; H02K 11/33; H02P 6/16
See application file for complete search history.

(56) References Cited

U.S. PATENT DOCUMENTS

2015/0214865 A1* 7/2015 Zhao ..................... H02K 5/04
318/400.42
2019/0036728 A1* 1/2019 Hu .......................... H02P 6/00

* cited by examiner

*Primary Examiner* — Zoheb S Imtiaz
(74) *Attorney, Agent, or Firm* — Matthias Scholl P.C.; Matthias Scholl

(57) ABSTRACT

An ECM including a motor body and a motor controller. The motor body includes a stator assembly. The stator assembly includes a stator winding. The motor controller includes a control circuit board, and the control circuit board includes a power source, a microprocessor, an insulated-gate bipolar transistor (IGBT) inverter circuit, and a plurality of universal interface modules. The motor controller is configured to be connected to a main control board of a heating, ventilation, and air conditioning (HVAC) system, to receive a command from the HVAC system, and to control the operation of the motor body based on the command. The power source is configured to supply power to each electric circuit of the motor controller. The IGBT inverter circuit includes an output terminal; the stator winding includes a coil winding; and the output terminal is connected to the coil winding.

13 Claims, 16 Drawing Sheets

ELECTRONICALLY COMMUTATED MOTOR, HVAC SYSTEM COMPRISING THE SAME, AND METHOD FOR SIGNAL CONVERSION BETWEEN HVAC SYSTEM AND MOTOR

CROSS-REFERENCE TO RELATED APPLICATIONS

This application is a continuation-in-part of International Patent Application No. PCT/CN2020/112387 with an international filing date of Aug. 31, 2020, designating the United States, now pending, and further claims foreign priority benefits to Chinese Patent Application No. 202010383705.1 filed May 8, 2020, and to Chinese Patent Application No. 202020745319.8 filed May 8, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an electronically commutated motor (ECM), a heating, ventilation, and air conditioning (HVAC) system comprising the ECM, and a method of signal conversion between the HVAC system and the motor.

In the field of heating, ventilation and air conditioning, there are many kinds of HVAC products and each HVAC product is provided with a specific control panel. Correspondingly, each HVAC product comprises a motor matching the specific control panel. That is, one kind of control panel corresponds to a kind of motor and is incompatible with other kinds of motors. When the control panel or motor of a HVAC product breaks down, a compatible control panel or motor may not be available at once. This is inconvenient for the maintenance of the HVAC product.

SUMMARY

The disclosure provides an ECM, a HVAC system and a method of signal conversion between the HVAC system and the motor.

The ECM comprises a motor body and a motor controller. The motor body comprises a housing, a stator assembly, and a rotor assembly. The stator assembly comprises a stator winding. The motor controller comprises a control circuit board, and the control circuit board comprises a power source, a microprocessor, an insulated-gate bipolar transistor (IGBT) inverter circuit, and a plurality of universal interface modules. The motor controller is configured to be connected to a main control board of a heating, ventilation, and air conditioning (HVAC) system, receive a command from the HVAC system, and control an operation of the motor body based on the command; the power source is configured to supply power to each electric circuit of the motor controller; the microcomputer is configured to control an operation of the IGBT inverter circuit; the IGBT inverter circuit comprises an output terminal; the stator winding comprises a coil winding; and the output terminal is connected to the coil winding; the plurality of universal interface modules comprises at least two types of modules selected from a multi-pin communication interface module, a multi-line communication interface module, a multi-position control interface module, a pulse-width modulation (PWM) signal communication interface module. The HVAC system is configured to communicate with the microprocessor via at least one of the plurality of universal interface modules. The motor comprises a plurality of universal interface modules, so it is compatible with a plurality of HVAC systems with different communication modes.

In a class of this embodiment, the multi-pin communication interface module is a 5-pin or a 16-pin communication interface module.

In a class of this embodiment, the multi-line communication interface module refers to a 4-line communication interface module.

In a class of this embodiment, the plurality of universal interface modules further comprise a Bluetooth module configured to provide communication between the microprocessor and the HVAC system.

In a class of this embodiment, the multi-position control interface module is a 5-position or 6-position control interface module.

In a class of this embodiment, the ECM further comprises a multi-way terminal block connected to the plurality of universal interface modules.

In a class of this embodiment, the plurality of universal interface modules is connected to the multi-way terminal block via a plurality of connecting wires.

In a class of this embodiment, the motor controller further comprises a control box; the control box comprises a first side and a second side; the first side is connected to the housing, and the second side is provided with a junction box; the multi-way terminal block is disposed in the junction box.

In a class of this embodiment, the multi-way terminal block comprises a plurality of groups of terminals; each group of terminals is connected to one of the plurality of universal interface modules via a plurality of the connecting wires; when in use, only one group of terminals communicates with one universal interface module; and a number of ways of each group of the terminals is equal to that of the connecting wires and to that of the signals transmitted by the one universal interface module.

In a class of this embodiment, the multi-way terminal block comprises a first connection part and a second connection part; the first connection part is connected to the HVAC system through a plurality of second connecting wires, and the second connection part is connected to the motor controller through the plurality of connecting wires; the first connection part comprises a plurality of first connection bases configured to receive the second plurality of connecting wires, respectively. The second connection part comprises a plurality of second connection bases configured to receive the first plurality of connecting wires, respectively.

A HVAC system comprises a main control board and the above-mentioned motor. The HVAC system is configured to communicate with the microprocessor via at least one of the plurality of universal interface modules.

The ECM further comprises a multi-way terminal block connected to the plurality of universal interface modules; the plurality of universal interface modules is connected to the multi-way terminal block via a plurality of connecting wires; and the main control board is connected to the multi-way terminal block via a plurality of second connecting wires.

A method of signal conversion between the HVAC system and the motor of the disclosure requires the following devices: a main control board of the HVAC system, an ECM described in Embodiment 1. The ECM comprises a motor controller and a multi-way terminal block connected to a plurality of universal interface module. The method comprises:

1) transmitting a communication signal from the main control board of the HVAC system;

2) transmitting the communication signal from the main control board to the multi-way terminal block via a plurality of second communication wires;

3) transmitting the communication signal from the multi-way terminal block to the motor controller via a plurality of first communication wires; and 4) identifying, by the motor controller, the communication signal; selecting one universal interface module from the plurality of universal interface modules and a signal switching circuit matching the communication signal; converting the communication signal by the signal converting circuit and transmitting to the microprocessor; processing the communication signal converted by the microprocessor and outputting a control signal through a motor interface circuit to the motor body, so that the motor body operates compatibly with the communication signal transmitted from the HVAC system.

In certain embodiments, the method of signal conversion between a main control board of a HVAC system and a motor is used for the replacement of a main control board of a HVAC system. When an old main control board is replaced by a new one, repeating the operations from 1) to 4) can establish a communication between the new main control board with the motor.

The plurality of universal interface modules of the ECM comprises at least two interface modules selected from a multi-pin communication interface module, a multi-line communication interface module, a multi-position control interface module, and a pulse-width modulation (PWM) signal communication interface module. The HVAC system is configured to communicate with the microprocessor via at least one of the plurality of universal interface modules. The motor comprises a plurality of universal interface modules, so it is compatible with a plurality of HVAC systems with different communication modes. The plurality of universal interface modules is integrated on the same control circuit board, and connected to the same microprocessor for communication. The control circuit has a simpler structure and a higher degree of integration. The motor of the disclosure offers easier installation, lower cost than prior art motors.

DETAILED DESCRIPTION

Figure 1:
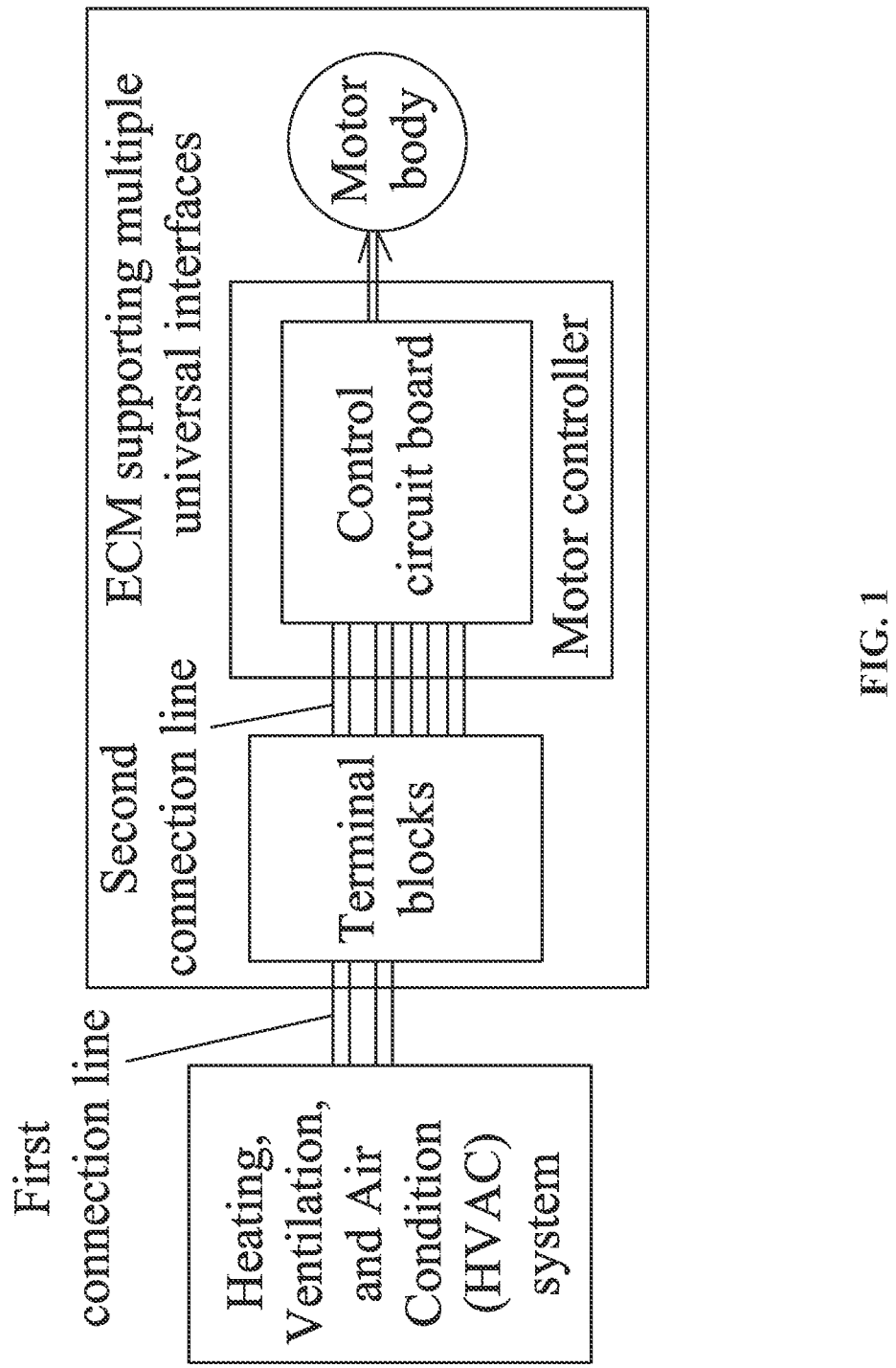
FIG. 1 is a schematic block diagram of a HVAC system in accordance with Example 1 of the disclosure.
Figure 2:
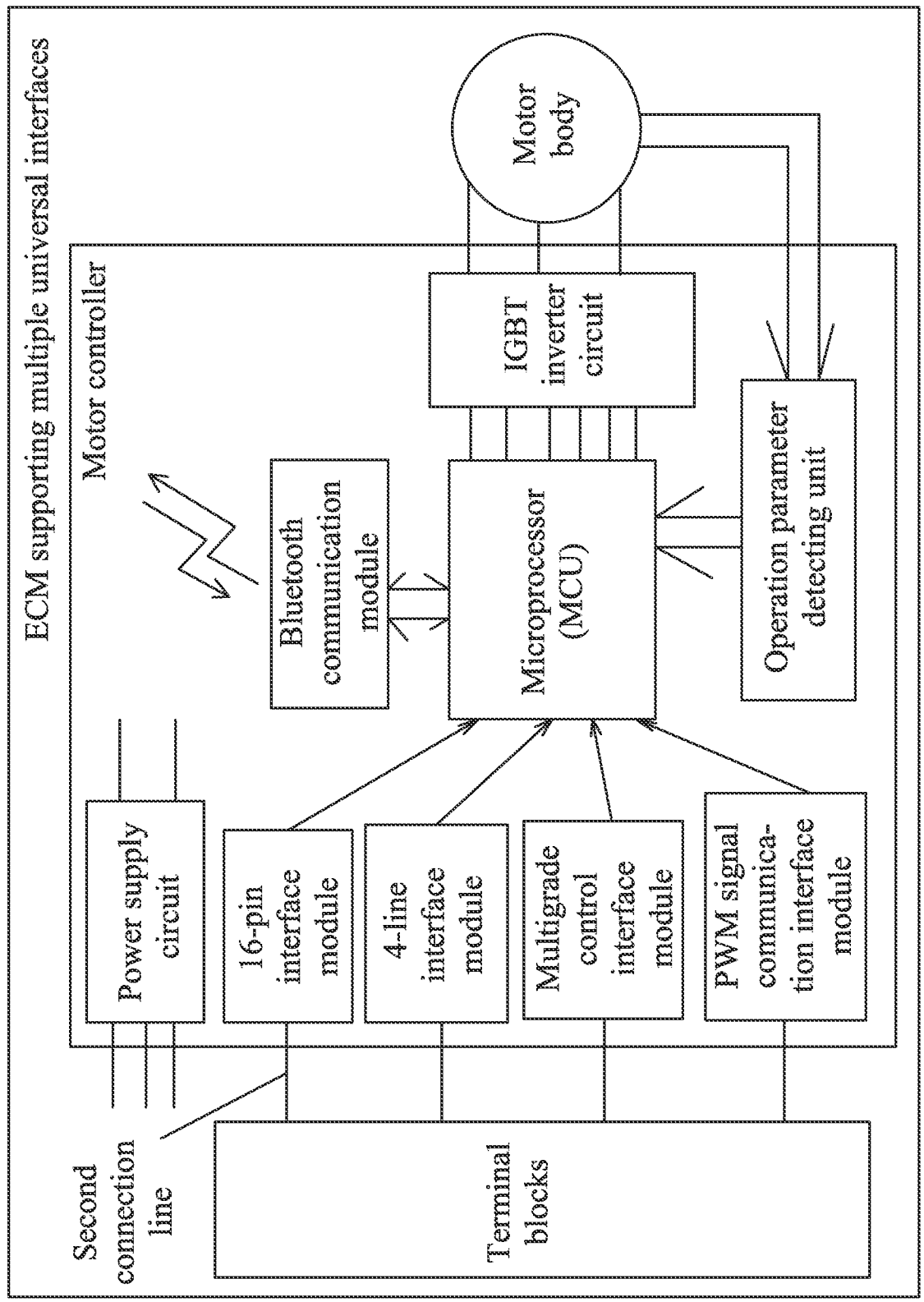
FIG. 2 is a block diagram of an ECM in FIG. 1.
Figure 3:
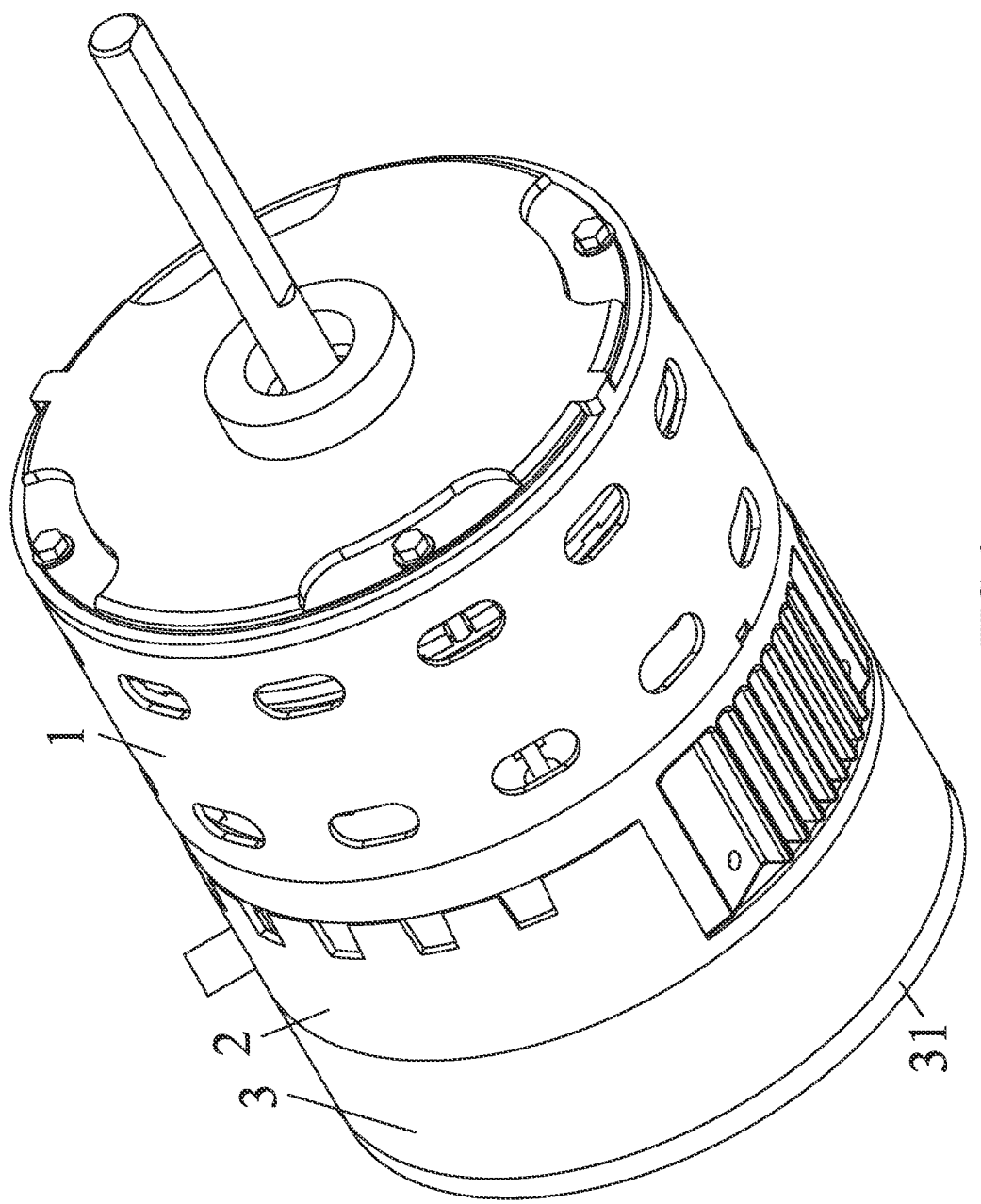
FIG. 3 is a perspective view of an ECM in accordance with Example 1 of the disclosure.
Figure 4:
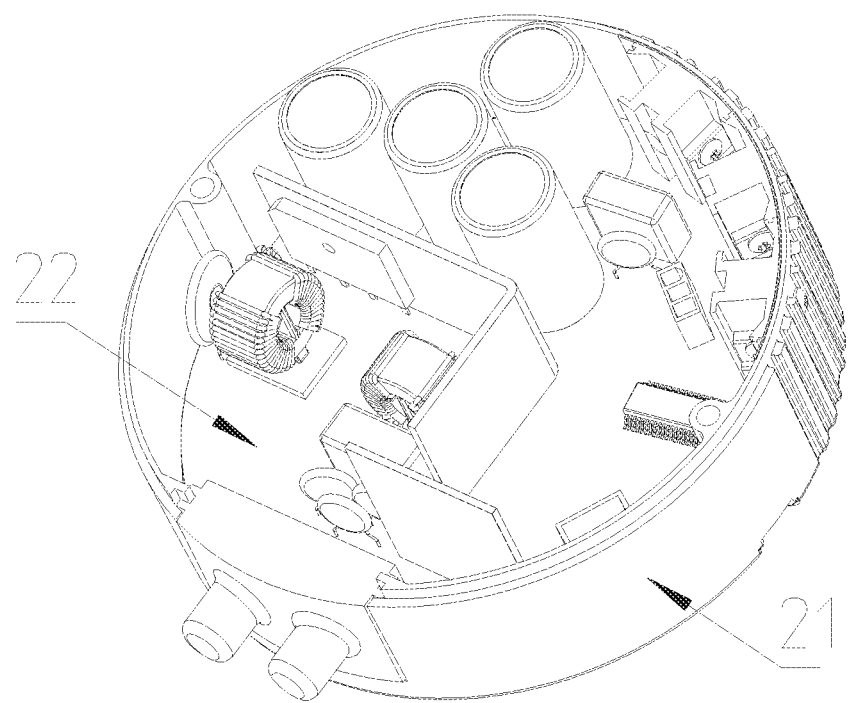
FIG. 4 is a schematic diagram of a motor controller in Example 1.
Figure 5:
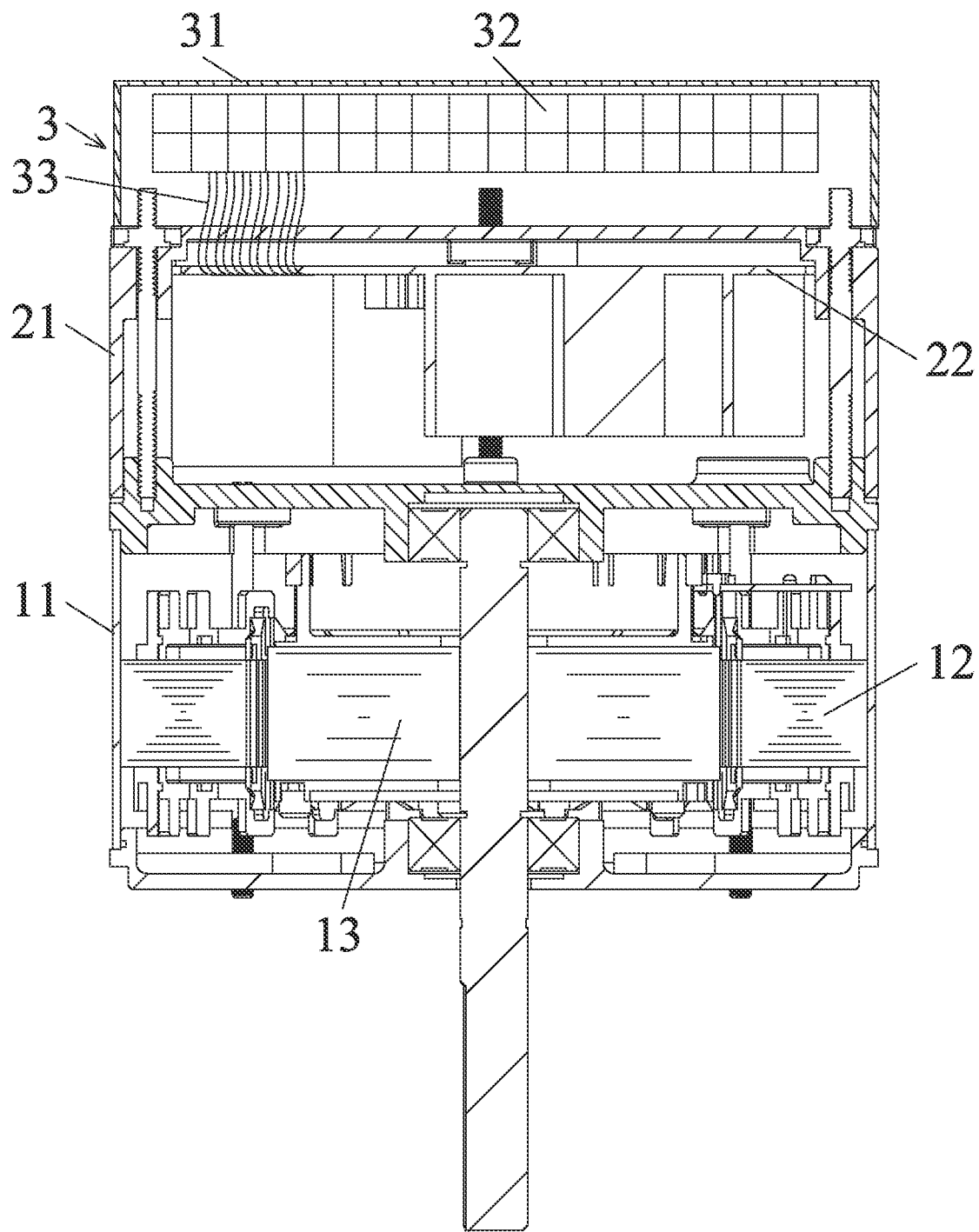
FIG. 5 is a schematic cross-sectional view of an ECM in accordance with Example 1 of the disclosure.

To further illustrate the disclosure, embodiments detailing an ECM, a HVAC system comprising the same, and a method of signal conversion between the HVAC system and the motor are described below. It should be noted that the following embodiments are intended to describe and not to limit the disclosure.

Example 1

An ECM comprises a motor body and a motor controller. The motor body comprises a housing, a stator assembly, and a rotor assembly. The stator assembly comprising a stator winding. The motor controller is configured to connect to a housing and a Heating, Ventilation, and Air Conditioning (HVAC) system, receive a command from the HVAC system, and control an operation of the motor body based on the command. The motor controller comprises a control circuit board. The control circuit board comprises a power source, a microprocessor, an insulated-gate bipolar transistor (IGBT) inverter circuit, and a plurality of universal interface modules. The power source is configured to supply power to each electric circuit of the motor controller. The microcomputer is configured to control an operation of the IGBT inverter circuit. The IGBT inverter circuit comprises an output terminal; the stator winding comprises a coil winding; and the output terminal is connected to the coil winding.

The plurality of universal interface modules comprises at least two types of modules selected from a multi-pin communication interface module, a multi-line communication interface module, a multi-position control interface module, a pulse-width modulation (PWM) signal communication interface module. The HVAC system is configured to communicate with the microprocessor via at least one of the plurality of universal interface modules. The motor comprises a plurality of universal interface modules, so it is compatible with a plurality of HVAC systems with different communication modes. The plurality of universal interface modules is integrated on the same control circuit board, and connected to the same microprocessor for communication. The control circuit has a simpler structure and a higher degree of integration. The motor offers easier installation, lower cost than prior art motors.

The multi-pin communication interface module is a 5-pin or 16-pin communication interface module.

The multi-line communication interface module is a 4-line communication interface module.

The multi-position control interface module is configured to receive a 5-position or 6-position control command from the HVAC system.

Referring to FIGS. 1-5, a motor comprises a motor body 1 and a motor controller 2. The motor body comprises a housing 11, a stator assembly 12, and a rotor assembly 13. The stator assembly 12 comprising a stator winding. The motor controller is configured to connect to a housing and a Heating, Ventilation, and Air Conditioning (HVAC) system, receive commands from the HVAC system, and control an operation of the motor body 1. The motor controller 2 comprises a control circuit board 22. The control circuit board 22 comprises a power source, a microprocessor (e.g. single-chip microcomputer (MCU)), an insulated-gate bipolar transistor (IGBT) inverter circuit, and a plurality of universal interface modules. The power source is configured to supply power to each electric circuit of the motor controller. The microcomputer is configured to control an operation of the IGBT inverter circuit. The IGBT inverter circuit comprises an output terminal; the stator winding comprises a coil winding; and the output terminal is connected to the coil winding.

The plurality of universal interface modules comprises a 16-pin communication interface module, a 4-line communication interface module, and a multi-position control interface module. The HVAC system is configured to communicate with the microprocessor via at least one of the plurality of universal interface modules.

The motor controller 2 further comprises a control box 21. The control box 21 comprises a first side and a second side. The first side is connected to the housing 11, and the second side is connected to a junction box 3. The multi-way terminal block is disposed in the junction box. The junction box 3 comprises a cover 31. The cover 31 is open prior to a wired connection. The multi-way terminal block 32 comprises a first connection part and a second connection part. The first connection part is connected to the HVAC system through a plurality of second connecting wires, and the second connection part is connected to the motor controller through the plurality of first connecting wires 33.

The plurality of universal interface modules further comprises a PWM signal communication interface module.

The plurality of universal interface modules further comprise a Bluetooth module configured to provide communication between the microprocessor and the HVAC system.

Figure 7A:
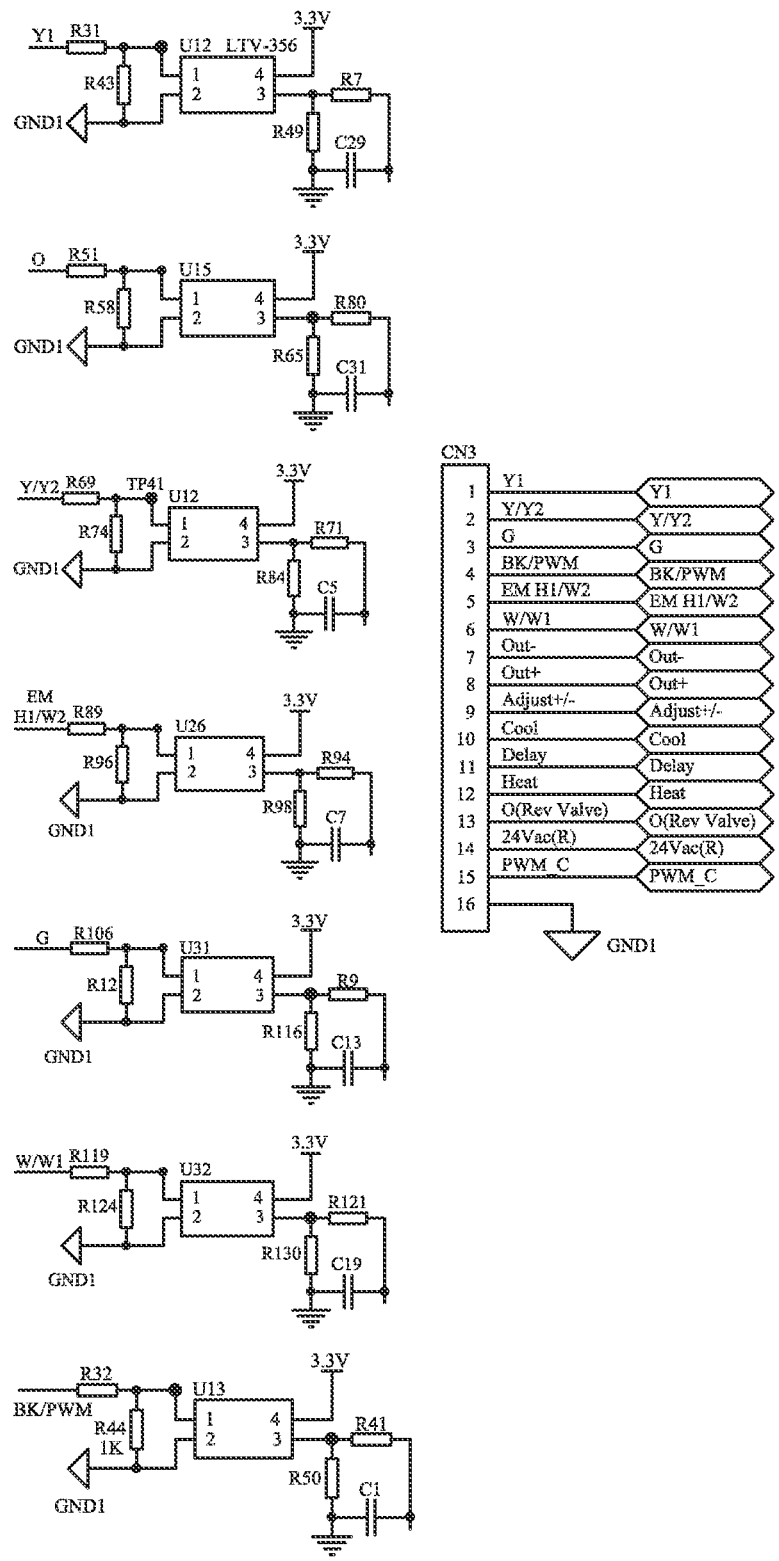
FIG. 7A is a first partial block diagram of a 16-pin communication interface module in accordance with Example 1 of the disclosure.
Figure 7B:
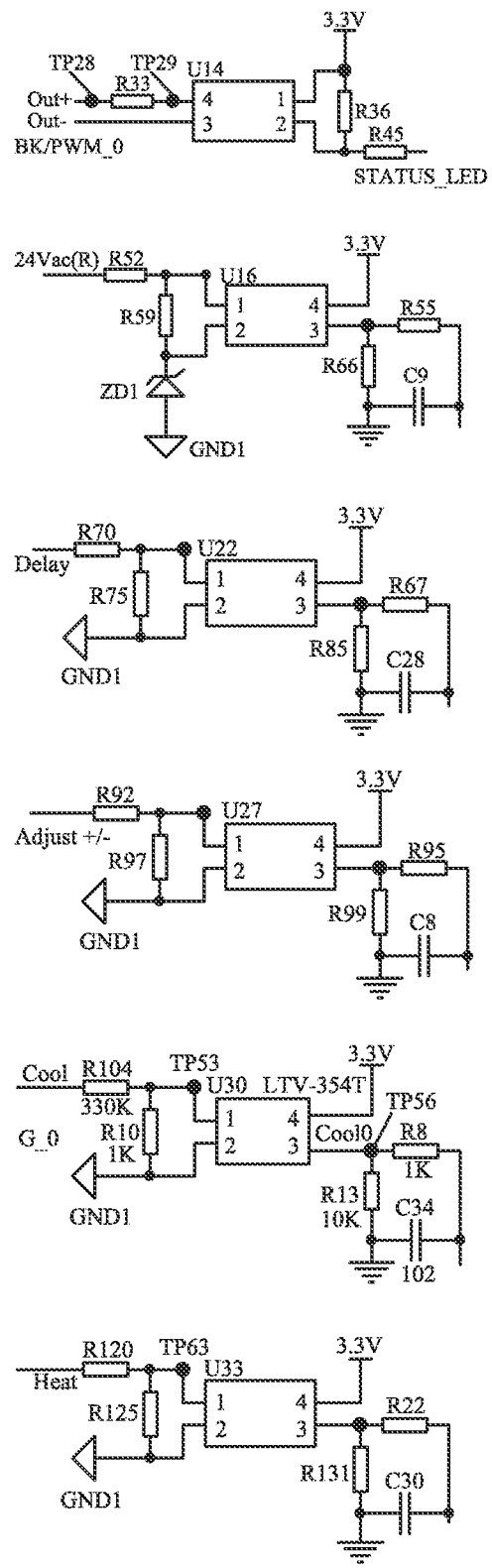
FIG. 7B is a second partial block diagram of a 16-pin communication interface module in accordance with Example 1 of the disclosure.

The 16-pin communication interface module is produced with reference to the ECM2.0/ECM2.3/ECM2.5 control mode of the series EON products in the US market. As shown in FIGS. 7A and 7B, the 16-pin communication interface module comprises 16 pins each with a snap-fit mechanism. Each of the 16 pins is connected to the multi-way terminal block 32 via a first connecting wire 33, wherein 13 signal conversion circuits are formed.

Figure 8:
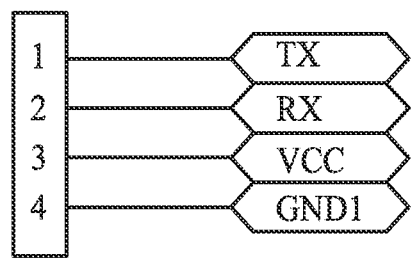
FIG. 8 is a block diagram of a 4-line communication interface module in accordance with Example 1 of the disclosure.
Figure 8:
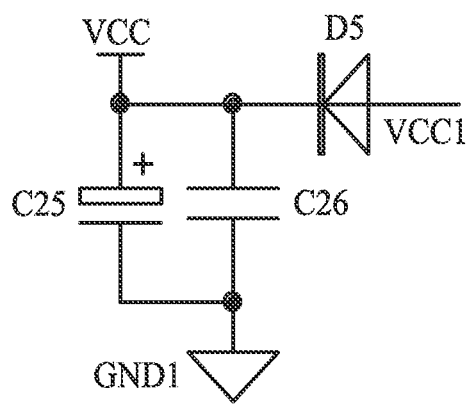
Figure 8:
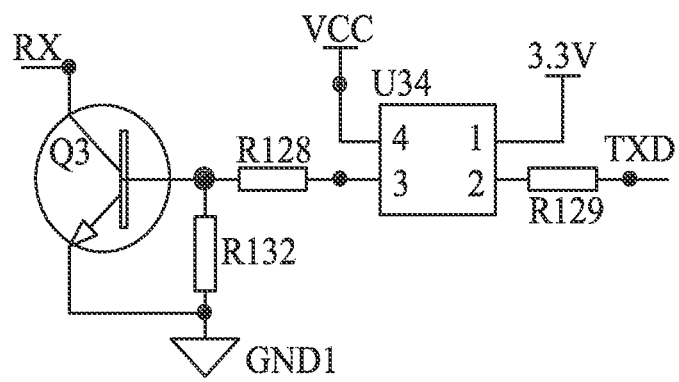
Figure 8:
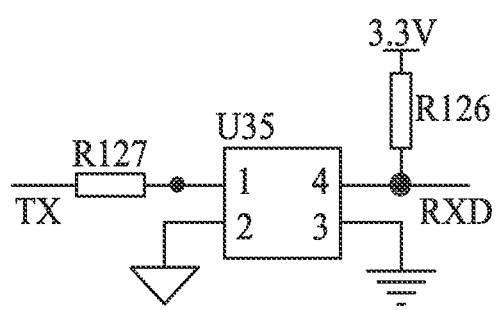

The 4-line communication interface module is produced with reference to the ECM3.0 control method of the series Emerson VSM products in the US market. As shown in FIG. 8, the 4-line communication interface module comprises 4 pins each with a snap-fit mechanism. Each of the 4 pins is connected to the multi-way terminal block 32 via a first connecting wire 33, wherein 2 signal converting circuits, also known as read/write serial communication circuits, are formed.

Figure 9:
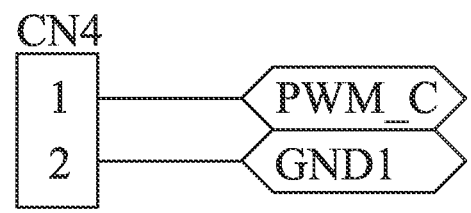
FIG. 9 is a block diagram of a PEM signal communication interface module in accordance with Example 1 of the disclosure.
Figure 9:
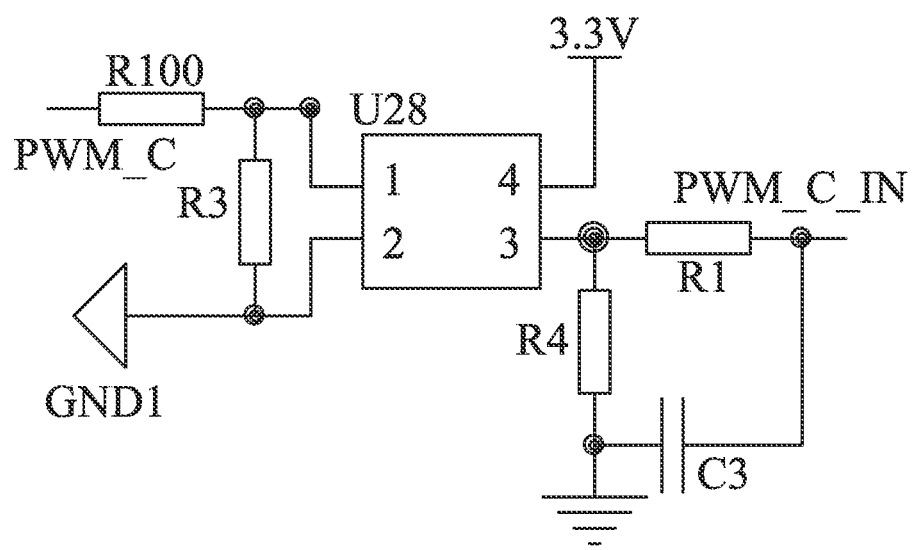

Referring to FIG. 9, the PWM signal communication interface module comprises 2 pins each with a snap-fit mechanism. Each of the 2 pins is connected to the multi-way terminal block 32 via a first connecting wire 33, and the PWM signal is converted through a photocoupler.

Figure 10:
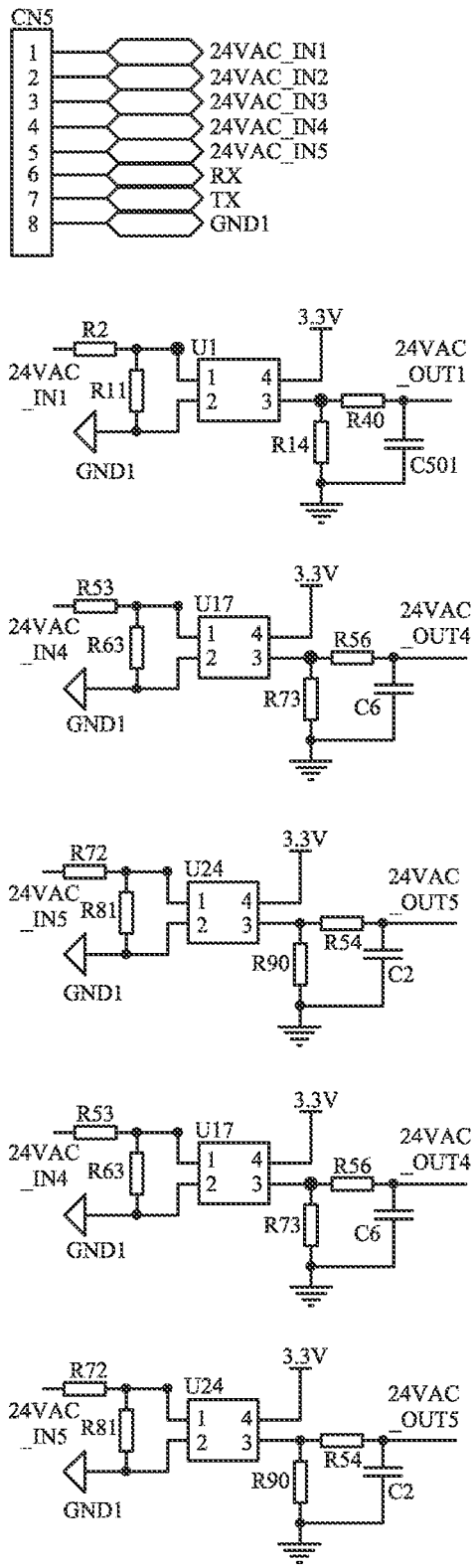
FIG. 10 is a block diagram of a multi-position control interface module in accordance with Example 1 of the disclosure.

The multi-position control interface module is configured to receive the 5-position or 6-position control command from the HVAC system. Referring to FIG. 10, the 5-position control interface module comprises 5 shift positions and 8 pins. Each of the 8 pins comprises a snap-fit mechanism, and is connected to the multi-way terminal block 32 via a first connecting wire 33. FIG. 10 shows five circuit diagrams illustrating the signal converting circuits of the 5 shift positions, wherein 5 input signals are respectively 24VAC IN1, 24VAC IN2, 24VAC IN3, 24VAC IN4, and 24VAC IN5. In addition to the 5 input signals there are two serial communication signals RX, TX, and a ground signal GND1.

Figure 11:
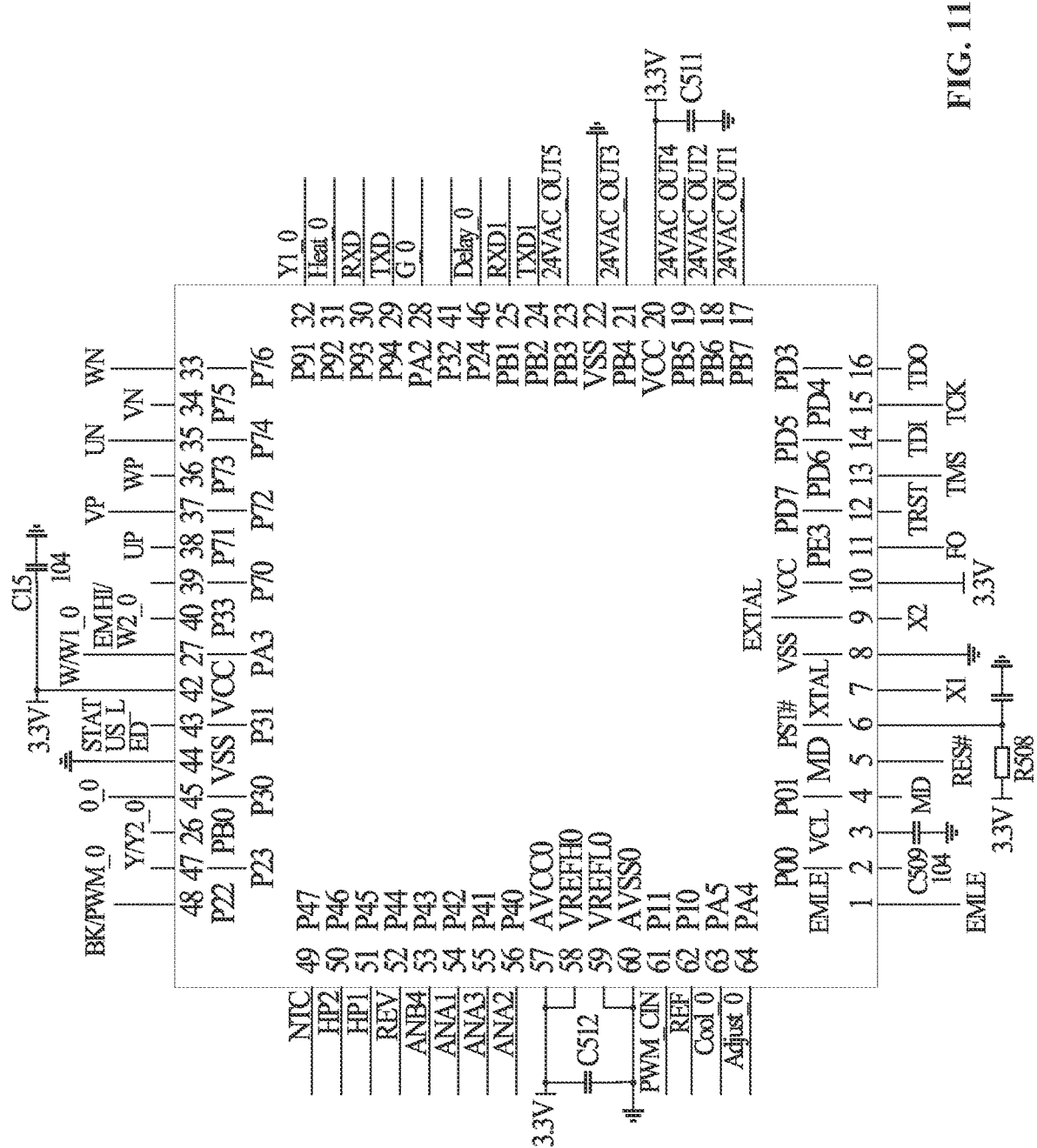
FIG. 11 is a block diagram of a microprocessor in accordance with Example 1 of the disclosure.

FIG. 11 is a circuit diagram illustrating the microprocessor according to the embodiment of the disclosure. The microprocessor is a microprogrammed control unit (MCU). The MCU comprises 64 pins configured to connect to the plurality of universal interface modules.

Figure 6:
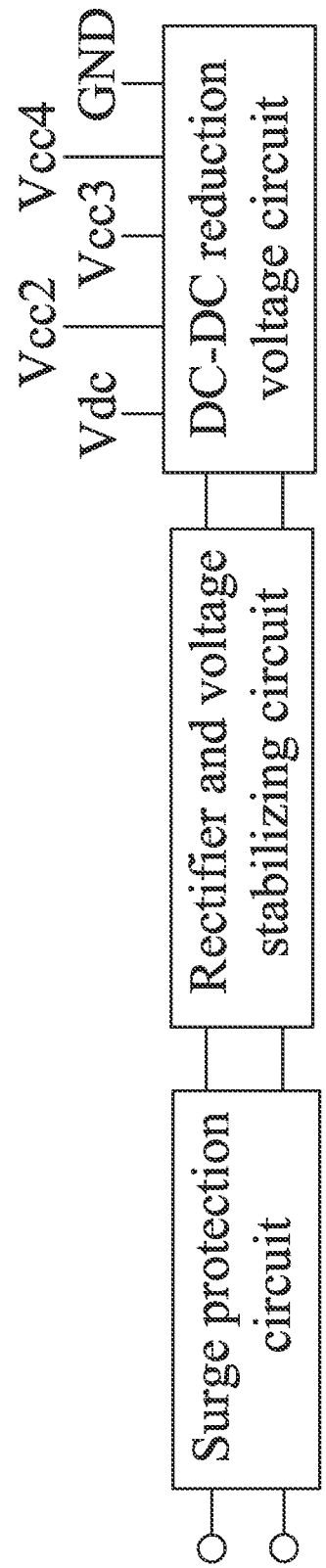
FIG. 6 is a block diagram of a power source in accordance with Example 1 of the disclosure.

Referring to FIG. 6, the power source comprises a surge protection circuit, a rectification and voltage regulation circuit, and a DC-DC step-down converter circuit. The power source outputs a high-voltage DC bus voltage Vdc of 310 V, a low-voltage DC voltage VCC2 of 24 V, a low-voltage DC voltage VCC3 of 15 V, and a low-voltage DC voltage VCC2 of 5 V. The power source is configured to provide electrical power to each electric circuit of the motor controller.

Figure 12:
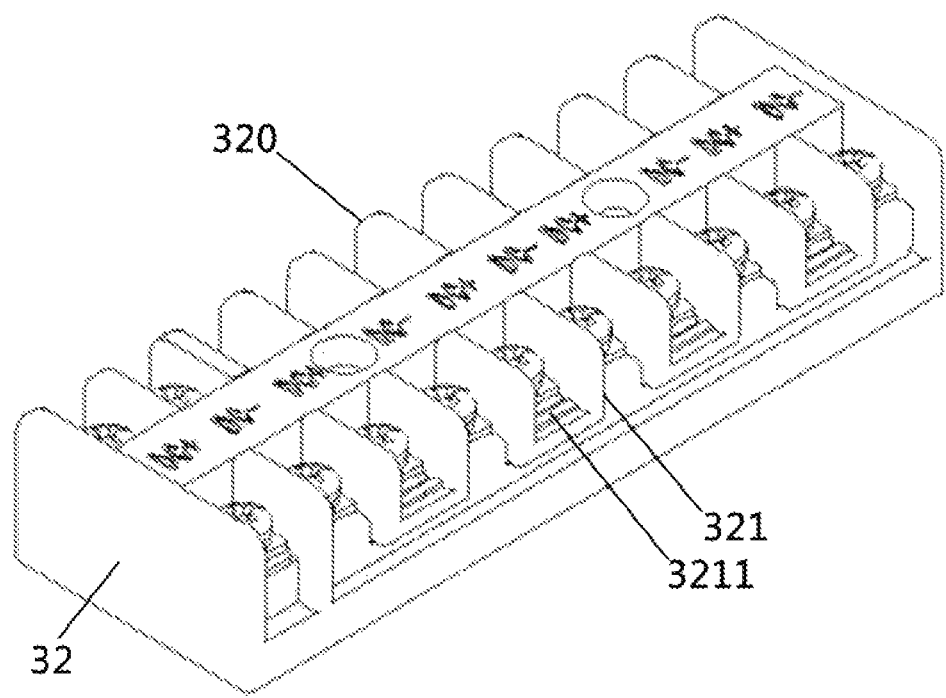
FIG. 12 is a perspective view of a multi-way terminal block in accordance with Example 1 of the disclosure.
Figure 13:
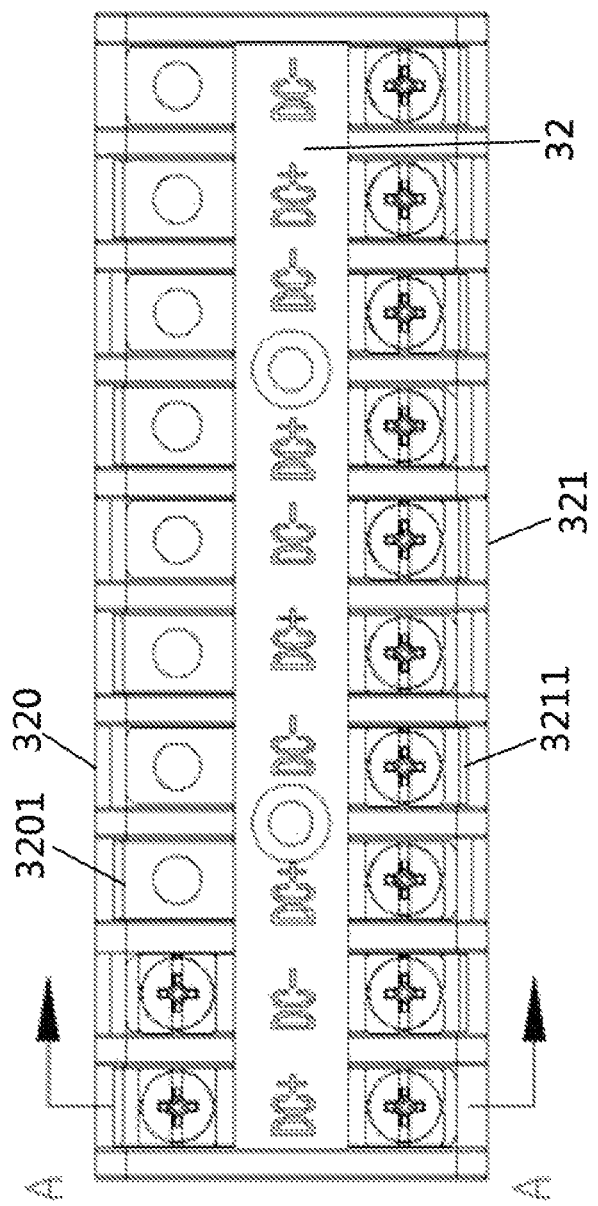
FIG. 13 is a top view of a multi-way terminal block in accordance with Example 1 of the disclosure.
Figure 14:
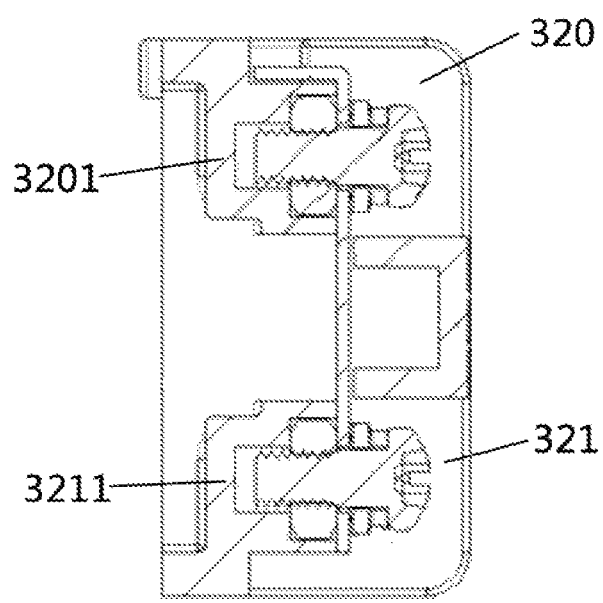
FIG. 14 is a cross-sectional view taken along the line A-A in FIG. 13.

The plurality of universal interface modules is connected to the multi-way terminal block 32 via a plurality of first connecting wires 33. The multi-way terminal block 32 as shown in FIGS. 12, 13 and 14 offers convenient, neat and standardized wiring installation over the prior art terminal blocks. The multi-way terminal block 32 comprises a first connection part 320 and a second connection part 321. The first connection part 320 is connected to the HVAC system through a plurality of second connecting wires, and the second connection part 321 is connected to the motor controller through a plurality of first connecting wires. The first connection part 320 comprises a plurality of first connection bases 3201 configured to receive the plurality of second connecting wires. The second connection part comprises a plurality of second connection bases 3211 configured to receive the plurality of first connecting wires. The multi-way terminal block provides the convenience of replacing the motor matching the main control board of a HVAC system.

The multi-way terminal block 32 comprises a plurality of groups of terminals. Each group of terminals is configured to connect to one of the universal interface modules through the plurality of first connecting wires 32. When in use, only one group of terminals communicates with one universal interface module. A number of ways of each group of the terminals is equal to that of the first connecting wires and to that of signals transmitted by the one universal interface module. The multi-way terminal block has simple structure and therefore is convenient for wiring connection.

The motor comprises a plurality of universal interface modules. The multiple universal interfaces comprise a 16-pin communication interface module, a 4-line communication interface module, and a multi-position control interface module. The HVAC system is configured to communicate with the microprocessor via at least one of the plurality of universal interface modules. The multiple universal interfaces are convenient for connecting the main control board of the HVAC system to the motor, improves compatibility between the HVAC system and the motor, and offers convenience for maintenance in aftermarket services.

Example 2

Figure 15:
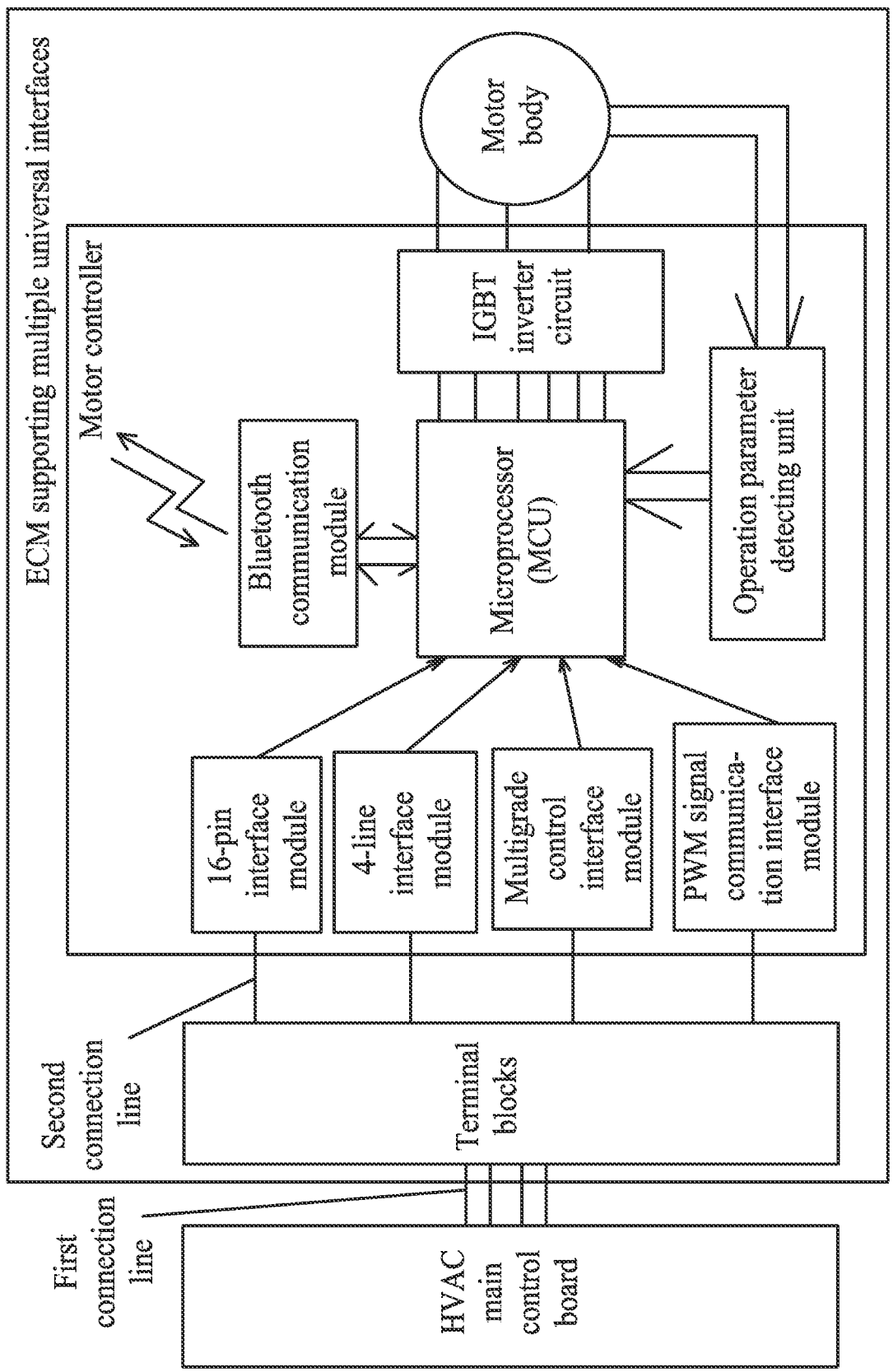
FIG. 15 is a block diagram of a HVAC system in accordance with Example 2 of the disclosure.

Referring to FIG. 15, a HVAC system comprises a main control board and a motor. The HVAC system is characterized in that the motor is the one described in Embodiment 1 that comprises a plurality of universal interfaces. The HVAC system is configured to communicate with the microprocessor via at least one of the plurality of universal interface modules.

The motor further comprises a multi-way terminal block connected to the plurality of universal interface modules through the plurality of first connecting wires. The main control board of the HVAC system is connected to the multi-way terminal block through the plurality of second connecting wires.

In some embodiment, the output signal interface of the HVAC system is produced with reference to PWM, 16Pin 24VAC control mode (i.e. ECM2.0/ECM2.3/ECM2.5 control mode) of the series EON products in the US market. The HVAC system is configured to communicate with the microprocessor via at least one of the plurality of universal interface modules. The universal interface module is a 16-pin communication interface module comprising a first connection side and a second connection side. The first connection side is connected to the main control board through 16 second connecting wires, and the second connection side is connected to the 16-pin communication interface module through 16 first connecting wires.

In some embodiment, the output signal interface of the HVAC system is produced with reference to PWM, 16Pin 24VAC control mode (i.e. ECM3.0 control mode&4-line communication mode) of the series Emerson VSM products in the US market. The HVAC system is configured to communicate with the microprocessor via at least one of the plurality of universal interface modules. The universal interface module is a 4-line communication interface module comprising a first connecting side and a second connecting side. The first connecting side is connected to the main control board via 4 second connecting wires, and the second connecting side is connected to the 4-line communication interface module via 4 first connecting wires.

Example 3

A method of signal conversion between the HVAC system and the motor of the disclosure requires the following devices: a main control board of the HVAC system, a motor described in Embodiment 1. The motor comprises a motor controller and a multi-way terminal block connected to a plurality of universal interface module. The method comprises:

1) transmitting a communication signal from the main control board of the HVAC system;

2) transmitting the communication signal from the main control board to the multi-way terminal block via a plurality of second communication wires;

3) transmitting the communication signal from the multi-way terminal block to the motor controller via a plurality of first communication wires; and 4) identifying, by the motor controller, the communication signal; selecting one universal interface module from the plurality of universal interface modules and a signal switching circuit matching the communication signal; converting the communication signal by the signal switching circuit and transmitting to the microprocessor; processing the communication signal converted by the microprocessor and outputting a control signal through a motor interface circuit to the motor body, so that the motor body operates compatibly with the communication signal transmitted from the HVAC system.

In certain embodiments, the method of signal conversion between a main control board of a HVAC system and a motor is used for the replacement of a main control board of a HVAC system. When an old main control board is replaced by a new one, repeating the operations from 1) to 4) can establish a communication between the new main control board with the motor.

It will be obvious to those skilled in the art that changes and modifications may be made, and therefore, the aim in the appended claims is to cover all such changes and modifications.

What is claimed is:

1. A motor, comprising:
   a motor body, the motor body comprising a housing, a stator assembly, and a rotor assembly, and the stator assembly comprising a stator winding; and
   a motor controller, the motor controller comprising a control circuit board, and the control circuit board comprising a power source, a microprocessor, an insulated-gate bipolar transistor (IGBT) inverter circuit, and a plurality of universal interface modules;
wherein:
   the motor controller is configured to be connected to a main control board of a heating, ventilation, and air conditioning (HVAC) system, to receive a command from the HVAC system, and to control an operation of the motor body based on the command;
   the power source is configured to supply power to each electric circuit of the motor controller;
   the microcomputer is configured to control an operation of the IGBT inverter circuit;
   the IGBT inverter circuit comprises an output terminal; the stator winding comprises a coil winding; and the output terminal is connected to the coil winding;
   the plurality of universal interface modules comprises at least two types of modules selected from a multi-pin communication interface module, a multi-line communication interface module, a multi-position control interface module, and a pulse-width modulation (PWM) signal communication interface module;
   the microprocessor is adapted to communicate with the HVAC system via one of the plurality of universal interface modules; and
   each of the plurality of universal interface modules comprises a plurality of signal input ports and is adapted to transmit a plurality of signals in a communication mode from the HVAC system into the microprocessor, whereby the microprocessor is communicated to the HVAC system under the communication mode.

2. The motor of claim 1, wherein the multi-pin communication interface module is a 5-pin or a 16-pin communication interface module.

3. The motor of claim 1, wherein the multi-line communication interface module refers to a 4-line communication interface module.

4. The motor of claim 1, wherein the plurality of universal interface modules further comprise a Bluetooth module configured to provide communication between the microprocessor and the HVAC system.

5. The motor of claim 1, wherein the multi-position control interface module is a 5-position or 6-position control interface module.

6. The motor of claim 1, further comprising a multi-way terminal block connected to the plurality of universal interface modules.

7. The motor of claim 6, wherein the plurality of universal interface modules is connected to the multi-way terminal block via a plurality of connecting wires.

8. The motor of claim 7, wherein the motor controller further comprises a control box; the control box comprises a first side and a second side; the first side is connected to the housing, and the second side is provided with a junction box; the multi-way terminal block is disposed in the junction box.

9. The motor of claim 8, wherein the multi-way terminal block comprises a plurality of groups of terminals; each group of terminals is connected to one of the plurality of universal interface modules via the plurality of connecting wires; when in use, only one group of terminals communicates with one universal interface module; and a number of ways of each group of the terminals is equal to that of the connecting wires and to that of signals transmitted by the one universal interface module.

10. The motor of claim 9, wherein the multi-way terminal block comprises a first connection part and a second connection part; the first connection part is connected to the HVAC system through a plurality of second connecting wires, and the second connection part is connected to the motor controller through the plurality of connecting wires; the first connection part comprises a plurality of first connection bases configured to receive the second plurality of connecting wires, respectively; and the second connection part comprises a plurality of second connection bases configured to receive the first plurality of connecting wires, respectively.

11. A HVAC system comprising a main control board and the motor of claim 1, wherein the motor communicates with the main control board through the microprocessor of the motor controller.

12. The system of claim 11, wherein the motor comprises a multi-way terminal block connected to the plurality of universal interface modules; the plurality of universal interface modules is connected to the multi-way terminal block via a plurality of connecting wires; and the main control board is connected to the multi-way terminal block via a plurality of second connecting wires.

13. A method of signal conversion between a main control board of a HVAC system and a motor of claim 1, the motor comprising a multi-way terminal block connected to the plurality of universal interface modules; the method comprising:
1) Transmitting a communication signal from the main control board of the HVAC system;
2) Transmitting the communication signal from the main control board to the multi-way terminal block via a plurality of second communication wires;
3) Transmitting the communication signal from the multi-way terminal block to the motor controller via a plurality of first communication wires; and
4) Identifying, by the motor controller, the communication signal; selecting one universal interface module from the plurality of universal interface modules and a signal switching circuit matching the communication signal; converting the communication signal by the signal switching circuit and transmitting to the microprocessor; processing the communication signal converted by the microprocessor and outputting a control signal through a motor interface circuit to the motor body, so that the motor body operates compatibly with the communication signal transmitted from the HVAC system.

* * * * *